(12) United States Patent
Uyeki

(10) Patent No.: US 11,097,632 B2
(45) Date of Patent: Aug. 24, 2021

(54) METHOD AND SYSTEM FOR COORDINATING A BATTERY EXCHANGE

(71) Applicant: HONDA MOTOR CO., LTD., Tokyo (JP)

(72) Inventor: Robert Uyeki, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 283 days.

(21) Appl. No.: 16/363,804

(22) Filed: Mar. 25, 2019

(65) Prior Publication Data

US 2020/0307409 A1    Oct. 1, 2020

(51) Int. Cl.
*B60L 53/80* (2019.01)
*G06F 9/30* (2018.01)
*B60L 53/65* (2019.01)

(52) U.S. Cl.
CPC ............ *B60L 53/80* (2019.02); *B60L 53/65* (2019.02); *G06F 9/30003* (2013.01)

(58) Field of Classification Search
CPC .......... B60L 53/80; B60L 53/65; B60L 53/66; G06F 9/30003; Y02T 90/169; Y04S 30/14; G06Q 30/0639; G06Q 50/06; H04L 67/2809; H04L 67/18
See application file for complete search history.

(56) References Cited

U.S. PATENT DOCUMENTS

| | | | | |
|---|---|---|---|---|
| 10,661,676 | B2* | 5/2020 | Takatsuka | B60L 53/80 |
| 10,787,092 | B2* | 9/2020 | Hou | B60L 53/80 |
| 2012/0303397 | A1* | 11/2012 | Prosser | B60L 53/00 705/7.12 |
| 2013/0026972 | A1* | 1/2013 | Luke | H02J 7/00 320/106 |
| 2016/0129793 | A1* | 5/2016 | Cronie | B60L 11/182 320/109 |
| 2016/0368464 | A1* | 12/2016 | Hassounah | B60L 53/80 |
| 2020/0086754 | A1* | 3/2020 | Hou | B60L 53/35 |
| 2020/0164760 | A1* | 5/2020 | Sohmshetty | B60S 5/06 |

* cited by examiner

*Primary Examiner* — Nha T Nguyen
(74) *Attorney, Agent, or Firm* — Arent Fox LLP

(57) ABSTRACT

Aspects of the present disclosure include methods, apparatus, and computer readable medium for a battery exchange including the steps of receiving a request for the battery exchange from a requesting device, identifying a supplying vehicle eligible to exchange one or more batteries, transmitting location information of the supplying vehicle to the requesting device, transmitting an unlock signal to the supplying vehicle or the requesting device to unlock a compartment containing the one or more batteries, and receiving one or more confirmation signals indicating completion of the battery exchange.

20 Claims, 7 Drawing Sheets

METHOD AND SYSTEM FOR COORDINATING A BATTERY EXCHANGE

TECHNICAL FIELD

The present disclosure relates to methods and systems for charging of an electric vehicle.

BACKGROUND

An electric vehicle uses one or more electric motors for propulsion of the vehicle. The electric motors may be powered by rechargeable batteries on-board the vehicle. A driver of an electric vehicle typically recharges the batteries of the vehicle according to different charging schedules that transfer electric energy to the vehicle. A utility company supplies the electric energy to the charging station and charges the driver for the electric energy based upon a variety of factors, for example, the time, day, month, and/or calendar season when the electric energy is provided. Therefore, improvements in cyber security may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods for a battery exchange including the steps of receiving a request for the battery exchange from a requesting device, identifying a supplying vehicle eligible to exchange one or more batteries, transmitting location information of the supplying vehicle to the requesting device, transmitting an unlock signal to the supplying vehicle or the requesting device to unlock a compartment containing the one or more batteries, and receiving one or more confirmation signals indicating completion of the battery exchange.

Aspects of the present disclosure include a server having a memory and one or more processors operatively connected to the memory, the one or more processors being configured to perform the steps of receiving a request for the battery exchange from a requesting device, identifying a supplying vehicle eligible to exchange one or more batteries, transmitting location information of the supplying vehicle to the requesting device, transmitting an unlock signal to the supplying vehicle or the requesting device to unlock a compartment containing the one or more batteries, and receiving one or more confirmation signals indicating completion of the battery exchange.

Aspects of the present disclosure include a non-transitory computer readable medium having instructions stored therein that, when executed by one or more processors of a server, cause the one or more processors to perform the steps of receiving a request for the battery exchange from a requesting device, identifying a supplying vehicle eligible to exchange one or more batteries, transmitting location information of the supplying vehicle to the requesting device, transmitting an unlock signal to the supplying vehicle or the requesting device to unlock a compartment containing the one or more batteries, and receiving one or more confirmation signals indicating completion of the battery exchange.

Aspects of the present disclosure include an apparatus for a battery exchange including means for receiving a request for the battery exchange from a requesting device, means for identifying a supplying vehicle eligible to exchange one or more batteries, means for transmitting location information of the supplying vehicle to the requesting device, means for transmitting an unlock signal to the supplying vehicle or the requesting device to unlock a compartment containing the one or more batteries, and means for receiving one or more confirmation signals indicating completion of the battery exchange.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
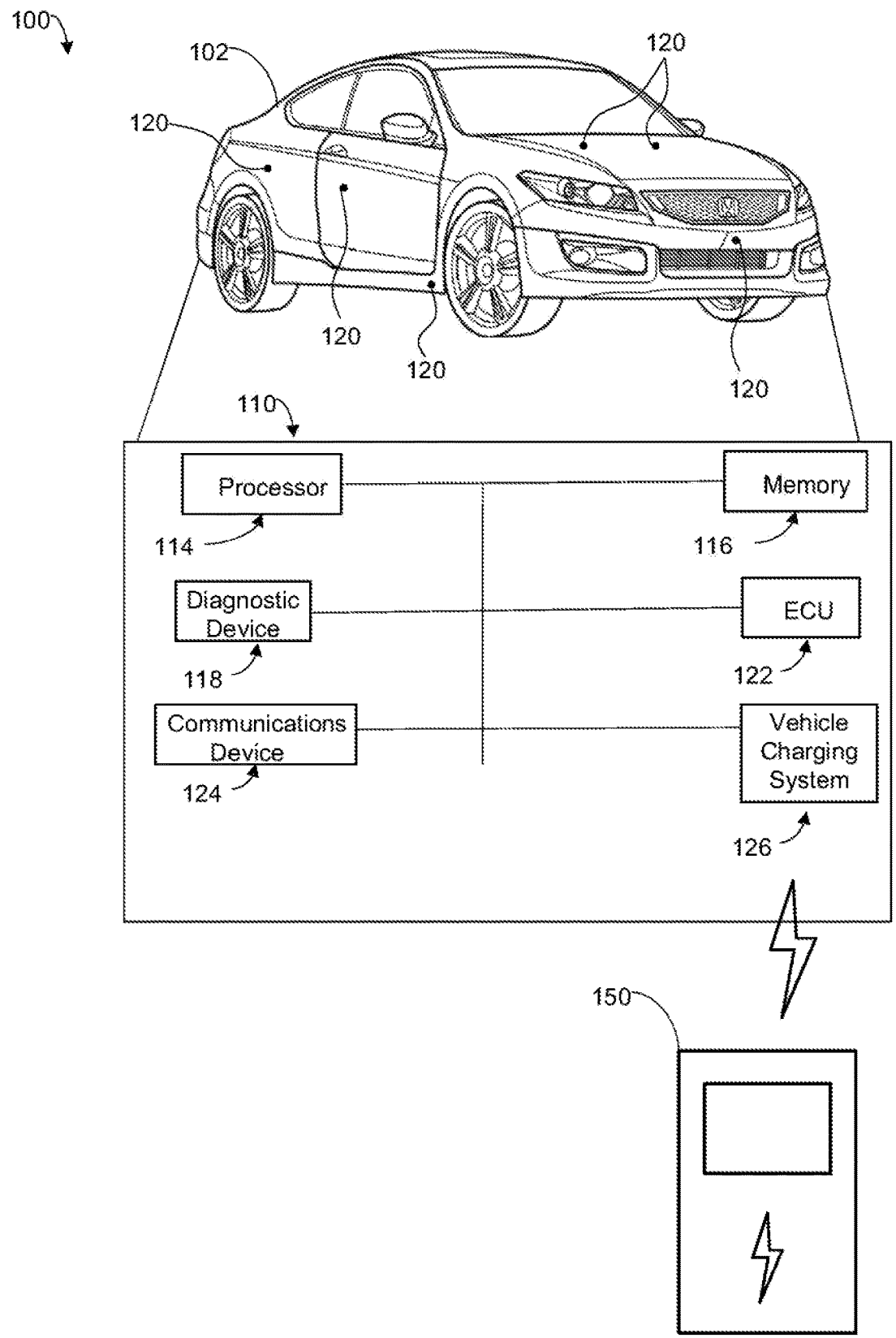
FIG. 1 illustrates an example of an environment for charging a vehicle in accordance with aspects of the present disclosure.

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "electronic vehicle," as used herein, can refer to any moving vehicle that is capable of carrying one or more human occupants and is powered by an electronic battery and/or any form of energy that can be recharged at a charging station. The term "electronic vehicle" can include, but is not limited to: cars, trucks, vans, minivans, SUVs, motorcycles, scooters, boats, personal watercraft, and aircraft.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

In certain implementations, a battery coordination server may coordinate the exchange of batteries between a requesting vehicle and a supplying vehicle. The requesting vehicle and the supplying vehicle may be battery electrical vehicles (BEVs) and/or plug-in hybrid electrical vehicles (PHEVs). When the battery(ies) of the requesting vehicle require charging, the owner of the requesting vehicle (from hereon the "requester") may be unable to locate a charging station. The requester may send a request to the battery coordination server to assist in locating the location of the supplying vehicle. If the owner of the supplying vehicle (from hereon the "supplier") is participating in the battery exchange program, the battery coordination server may notify the requester the location of the supplying vehicle. When the requester and the requesting vehicle reaches supplying vehicle, the battery coordination server may transmit a signal to the supply vehicle to unlock the compartment containing the batteries. The requester may swap the drained battery from the requesting vehicle with the charged battery from the supplying vehicle.

Turning to FIG. 1, a schematic view of a non-limiting example of an operating environment 100 including a supplying vehicle 102 that provides batteries to requesters. The supplying vehicle 102 may include a vehicle computer system 110 including a processor 114 and a memory 116. The vehicle computer system 110 may reside within the supplying vehicle 102. The vehicle computer system 110 may include a vehicle infotainment system, a vehicle telematics system, or other systems within the supplying vehicle 102. The components of the vehicle computer system 110, as well as the components of other systems, hardware architectures, and software architectures discussed herein, may be combined, omitted or organized into various implementations.

The supplying vehicle 102 may include an electric motor, which may be powered by rechargeable batteries (not shown) on-board the supplying vehicle 102. The on-board batteries may be charged when the supplying vehicle 102 is connected to a charging station 150. In some aspects, the vehicle charging system 126 may be connected to a charging station 150 via a charging cable. In other aspects, the vehicle charging system 126 may be connected to the charging station 150 wirelessly. The charging station 150 may be a device that provides electric energy to the supplying vehicle 102. The electric energy may be supplied to the charging station 150 by a third party, such as a utility company, through an electrical grid. In some aspects, the charging station 150 may be located at a driver's home or office. In some aspects, the charging station 150 may be located at a public location, such as a retail shopping center or a rest stop.

Referring to FIG. 1, the supplying vehicle 102 may generally include an electronic control unit (ECU) 122 that operably controls a plurality of vehicle systems. The vehicle systems may include, but are not limited to, the vehicle computer system 110, among others, including vehicle HVAC systems, vehicle audio systems, vehicle video systems, vehicle infotainment systems, vehicle telephone systems, vehicle control systems, and the like.

The supplying vehicle 102 may further include a communications device 124 (e.g., wireless modem) for providing wired or wireless computer communications utilizing various protocols to send/receive electronic signals internally with respect to features and systems within the supplying vehicle 102 and with respect to external devices. These protocols may include a wireless system utilizing RF communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 124 of the supplying vehicle 102 may be operably connected for internal computer communication via a bus (e.g., a CAN or a LIN protocol bus) to facilitate data input and output between the electronic control unit 122 and vehicle features and systems. In an aspect, the communications device 124 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some implementations, the vehicle computer system 110 may include a diagnostic device 118 and one or more sensors 120. The diagnostic device 118 may obtain information from the sensors 120. The sensors 120 may be disposed throughout the supplying vehicle 102, and collect information such as fuel quantity, fuel range, speedometer reading, odometer reading, door locks status, global positioning system (GPS) data, entertainment system data, tire pressure reading, battery reading, fluid level, and other information relevant to the operation of the supplying vehicle 102.

Figure 2:
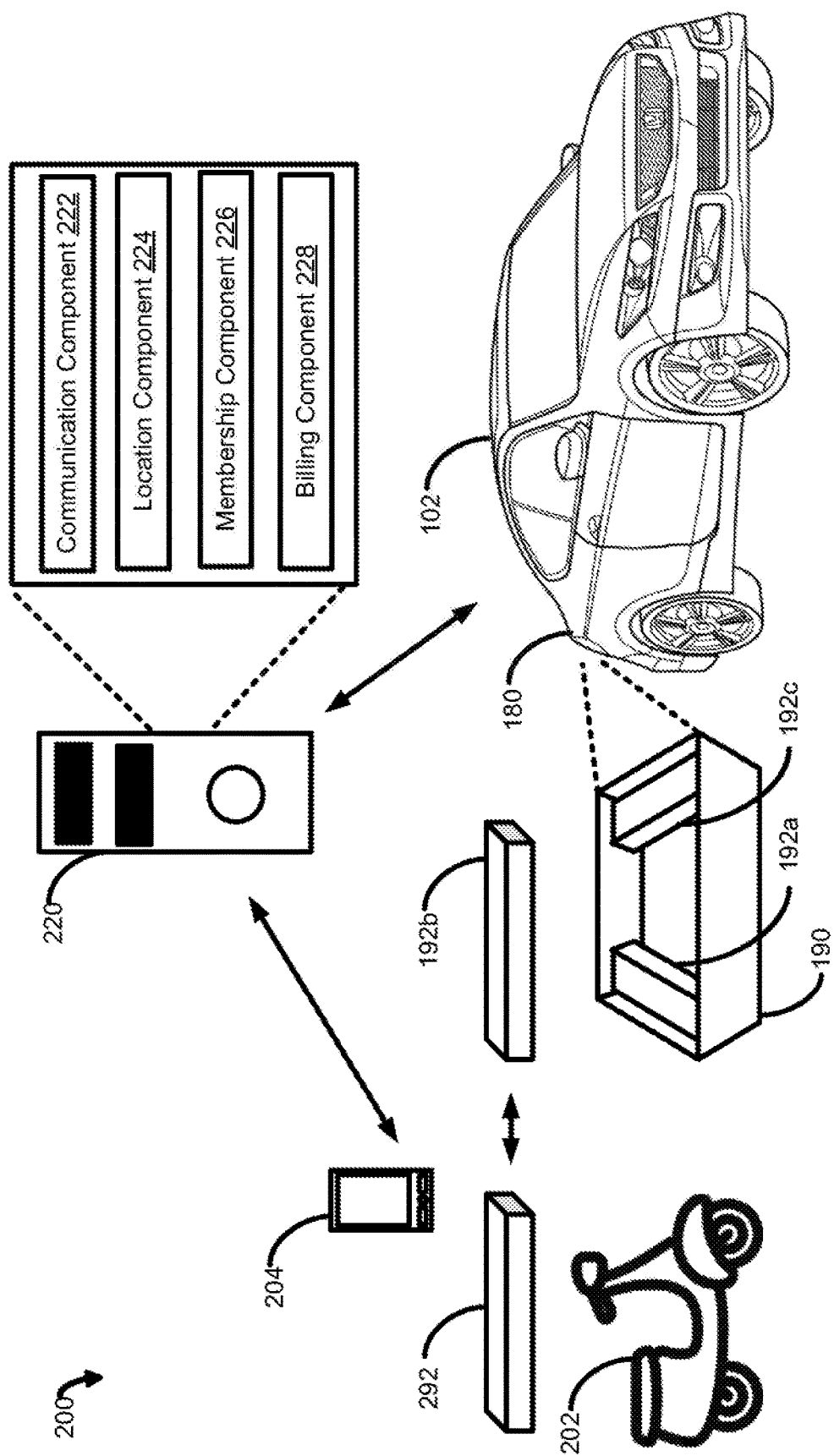
FIG. 2 illustrates an example of an environment for a battery exchange in accordance with aspects of the present disclosure.

Turning now to FIG. 2 in some aspects, an example of an environment for exchanging batteries may include the supplying vehicle 102, a requesting device 204 associated with the requester and a requesting vehicle 202, and a battery coordination server 220. The requesting device 204 may be a cellular phone, a mobile phone, a tablet computer, a personal digital assistant, a smart device, or other devices capable of wireless communication. The requesting device 204 may be integrated into the requesting vehicle 202. The battery coordination server 220 may coordinate the exchange of batteries between the supplying vehicle 102 and the requesting device 204. The requesting vehicle 202 and the supplying vehicle 102 may be BEVs and/or PHEVs that may utilize batteries during operation. When the one or more batteries, such as a drained battery 292, of the requesting vehicle 202 require charging to replenish stored electrical energy, the requester may be unable to locate a charging station. The requester may utilize a requesting device 204 to send a request to the battery coordination server to assist in locating the location of a supplying vehicle and/or a charging station.

In certain examples, the supplying vehicle 102 may include a compartment 180 (e.g., a trunk compartment) that stores a mobile power pack (MPP) 190 having a first battery 192a, a second battery 192b, and a third battery 192c. Each one of the first battery 192a, the second battery 192b, and the third battery 192c may include a unique identifier (ID) identifying the battery and a state of charge (SoC) indicating a percentage associated with the "charge fullness" of the battery. The first battery 192a, the second battery 192b, and the third battery 192c may be separately lockable within the MPP 190. The MPP 190 and the first battery 192a, the second battery 192b, and the third battery 192c may be charged when the supplying vehicle 102 is being charged at the charging station 150, during normal operations of the supplying vehicle 102 (e.g., charged by on-board generators), or other means (e.g., charged by exposing on-board solar panels to sunlight). The MPP 190 and/or the batteries 192 may include indicator lights showing the SoC information and/or indicator lights showing which one of the batteries 192 is available for exchange. The batteries 192 may be lithium-ion batteries, nickel-cadmium batteries, nickel metal hydride batteries, lead acid batteries, or other types of rechargeable batteries.

In some instances, the communication component 222 of the battery coordination server 220 may receive the request from the requesting device 204. The battery coordination server 220 may utilize membership component 226 to optionally determine supplying vehicles that are available and/or eligible to fulfill the request. If the supplier of the supplying vehicle 102 is eligible to fulfill the request (e.g., participating in a battery exchange program associated with the battery coordination server 220, including extra charged battery available for exchange, and/or being in the vicinity of the requesting device 204), the battery coordination server 220 may notify the requesting device 204 the location of the supplying vehicle 102. When the requester and the requesting vehicle 202 reaches the supplying vehicle 102, the battery coordination server may transmit a signal to the supplying vehicle 102 to unlock the compartment 180 containing the MPP 190 and the batteries 192, and/or the battery 192b to be exchanged. The requester may swap the drained battery 292 (e.g., SoC less than 20%) from the requesting vehicle 202 with the charged battery, such as the battery 192b, from the supplying vehicle 102.

Figure 3:
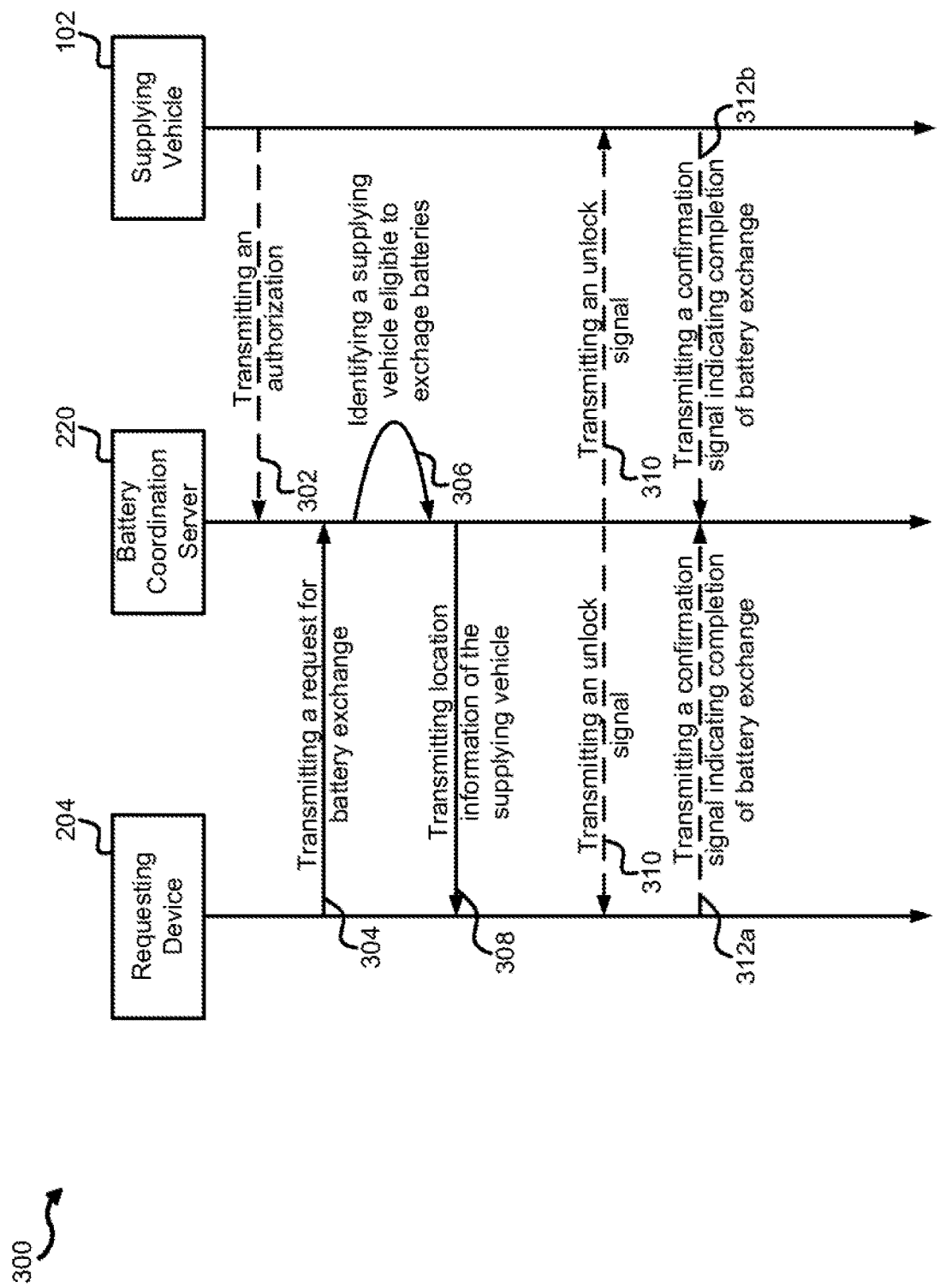
FIG. 3 illustrates an example of a flow chart for exchanging a battery in accordance with aspects of the present disclosure.

Referring to FIG. 3, an example method 300 for exchanging a battery is discussed in connection with the description of the architectures of FIGS. 1 and 2. In some examples, at 302, the supplying vehicle 102 may optionally transmit an authorization to the battery coordination server 220 using a communication component 222. The authorization may include supplier providing approval for the battery coordination server 220 to access the compartment of the supplying vehicle 102. The approval may be a one-time approval, an approval for a specified period for exchanges, an approval for a specific amount of exchanges, an approval with one or more specific conditions (e.g., price for the exchange, limit on the number of batteries for exchanges, time of the day available for exchanges, etc.), or an open-ended approval.

In some aspects, at 304, the requesting device 204 and/or the requesting vehicle 202 may transmit a request for a battery exchange using the communication component 222. The request may include location information of the requesting vehicle 202, the number of batteries to be exchanged, preferred time for the exchange, and/or other relevant information.

In certain implementations, at 306, the battery coordination server 220 may identify the supplying vehicle 102 as eligible to exchange the battery 192b with the requesting vehicle 202. The battery coordination server 220 may rely on the membership component 226 to check for vehicles that are eligible for the exchange, which may be based at least in part on the information in the request sent by the requesting device 204. For example, the membership component 226 may search for vehicles that are able to exchange the number of batteries requested in the vicinity (e.g., within 1 mile, 2 miles, 5 miles, 10 miles, 15 miles, 20 miles, or 50 miles radius) of the requesting vehicle 202. In another example, the membership component 226 may search for vehicles that are able exchange the number of batteries requested at a time specified in the request. In yet another non-limiting example, the membership component 226 may search for vehicles that are able to exchange at least some of the batteries requested.

In some aspects, when identifying the supplying vehicle 102, the battery coordination server 220 may rely on a location component 224 to determine location information of the supplying vehicle 102. The location component 224 may rely on information provided by the supplying vehicle 102 to generate the location information.

In certain aspects, at block 308, the battery coordination server 220 may transmit the location information of the supplying vehicle 102, via the communication component 222, to the requesting device 204 and/or requesting vehicle 202 in response to the request. The location information may include global positioning system information, latitude and longitude coordinates, street address, and/or other information that identify the location of the supplying vehicle 102.

In some implementations, at 310, the battery coordination server 220 may transmit an unlock signal, via the communication component 222, to the supplying vehicle 102 to unlock the compartment 180 and/or the battery 192b. The unlock signal may be transmitted when the requesting device 204 and/or requesting vehicle 202 notify the battery coordination server 220 that the requester is ready for the battery exchange. The unlock signal may unlock the compartment 180, the MPP 190, and/or the battery 192b. In some instances, the battery coordination server 220 may transmit the unlock signal having an unlock code, via the communication component 222, to the requesting device 204. The requester may use the unlock code to gain access to the compartment 180, the MPP 190, and/or the battery 192b. The requester may enter the unlock code into a keypad associated with the compartment 180. In some examples, the unlock code may be a single use code.

When the supplying vehicle 102 receives the unlock signal, the supplying vehicle 102 may select one of the batteries 192, such as the battery 192b to be exchanged. The vehicle charging system 126 of the supplying vehicle 102 may select the battery 192b using one or more algorithms. For example, the vehicle charging system 126 may select a fully-charged battery having a maximum capacity in a range of 70% to 100%, 80% to 100%, 90% to 100%, 70% to 95%, 80% to 95%, 90% to 95%, 65% to 95%, 75% to 95%, 85% to 95%, 65% to 90%, 65% to 85%, or other acceptable ranges. In another example, the vehicle charging system 126 may select a fully-charged battery based on at least one of a usage history, charging history, usage frequency, severity of "memory effect" of the batteries, parameters relating to the requester and/or the requesting vehicle 202 (e.g., total battery capacity, intended traveling distance, payment, reward points, time of exchange), parameters relating to the supplier and/or the suppling vehicle 102 (e.g., remaining battery capacity, intended traveling distance, payment, reward points, time of exchange, remaining time to charge other batteries).

In optional implementations, at 312, the requesting device 204, the requesting vehicle 202, and/or the supplying vehicle 102 may transmit a confirmation signal indicating completion of the battery exchange. In some cases, in response to receiving the confirmation signal, the battery coordination server 220 may transmit a lock signal to supplying 102 to lock the compartment 180, the MPP 190, and/or the battery 192b. In other examples, the battery coordination server 220 may rely on the billing component 228 to record the battery exchange. The billing component 228 may provide funds to the requester's account and/or the supplier's account, charge the requester's account, or take other actions.

Figure 4:
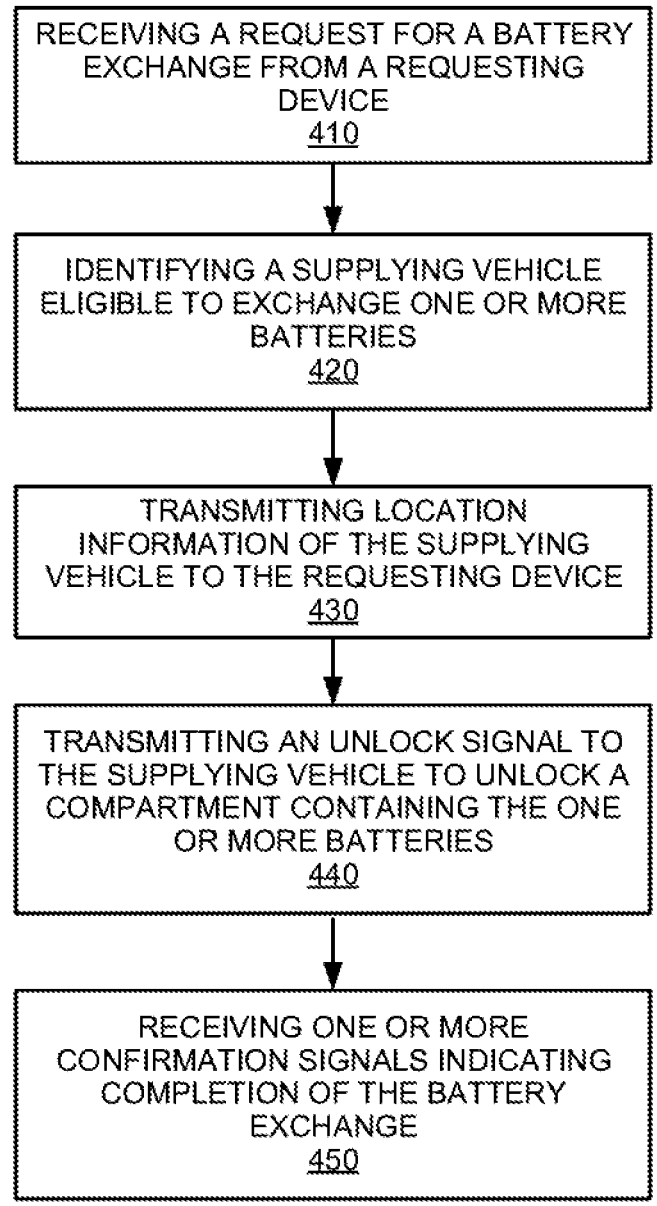
FIG. 4 illustrates an example of a method for coordinating a battery exchange in accordance with aspects of the present disclosure.

Turning now to FIG. 4, a method 400 for coordinating a battery exchange process may be performed by the battery coordination server 220.

At block 410, the method 400 may receive a request for a battery exchange from a requesting device. For example, the communication component 222 of the battery coordination server 220 may receive a request for a battery exchange from the requesting device 204. The request may include at least one of location information of the requesting device, a number of the one or more batteries to be exchanged, and a time for the battery exchange.

At block 420, the method 400 may identifying a supplying vehicle eligible to exchange one or more batteries. For example, the membership component 226 may identify the supplying vehicle 102 eligible to exchange the battery 192b.

At block 430, the method 400 may transmit location information of the supplying vehicle to the requesting device. For example, the communication component 222 may transmit location information of the supplying vehicle 102 to the requesting device 204.

At block 440, the method 400 may transmit an unlock signal to the supplying vehicle or the requesting device to unlock a compartment containing the one or more batteries. For example, the communication component 222 may transmit an unlock signal to the supplying vehicle 102 to unlock the compartment 180 containing the battery 192b. Alternatively, the communication component 222 may transmit the unlock signal including an unlock code to the requesting device 204. The requester may enter the unlock code into a keypad associated with the compartment 180 and gain access to the compartment 180, the MPP 190, and/or the batteries 192. In some examples, the communication component 222 may transmit the unlock signal in response to receiving an indication from the requesting device 204 to unlock the compartment.

At block 450, the method 400 may optionally receive one or more confirmation signals indicating completion of the battery exchange. For example, the communication component 222 may receive one or more confirmation signals from the requesting device 204, the requesting vehicle 202, and/or the supplying vehicle 102.

In some implementations, the battery coordination server 220 may upload GPS location of the supplying vehicle 102 and/or the requesting vehicle 202.

In some aspects, the battery coordination server 220 may perform battery management. The battery management may include determining which batteries to exchange based on SoC, usage, and/or charging cycles. The battery management may include initiating the charging of the exchanged battery (e.g., the drained battery 292) after the exchange (i.e., when the drained battery 292 is inserted into the MPP 190), if the supplying vehicle 102 is at the charging station 150. The battery management may include waiting to charge the drained battery 292 during driving.

Figure 5:
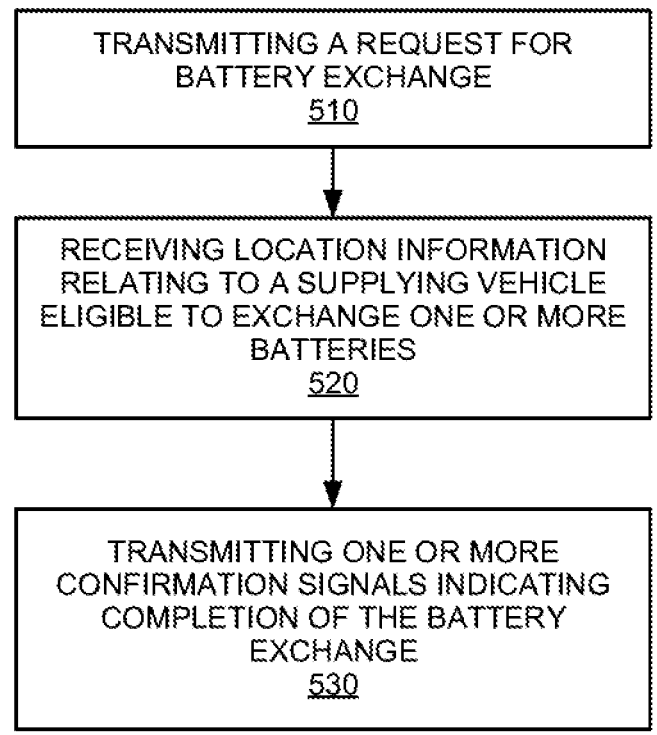
FIG. 5 illustrates an example of a method for requesting a battery exchange in accordance with aspects of the present disclosure.

Turning now to FIG. 5, a method 500 for requesting a battery exchange may be performed by the requesting device 204.

At block 510, the method 500 may transmit a request for battery exchange. The requesting device 204 may transmit the request. The request may include location information of the requesting vehicle 202, the number of batteries to be exchanged, preferred time for the exchange, and/or other relevant information.

At block 520, the method 500 may receive location information relating to a supplying vehicle eligible to exchange one or more batteries. For example, the requesting device 204 may receive location information of the supplying vehicle 102 eligible to exchange the battery 192b. In one example, the requester, the requesting vehicle, and/or the requesting device 204 may rely on the location information to locate and reach the supplying vehicle 102.

At block 530, the method 500 may optionally transmit one or more confirmation signals indicating completion of the battery exchange. The one or more confirmation signals may be transmitted in response to the requesting vehicle 202 receiving the new battery from the supplying vehicle 102.

Figure 6:
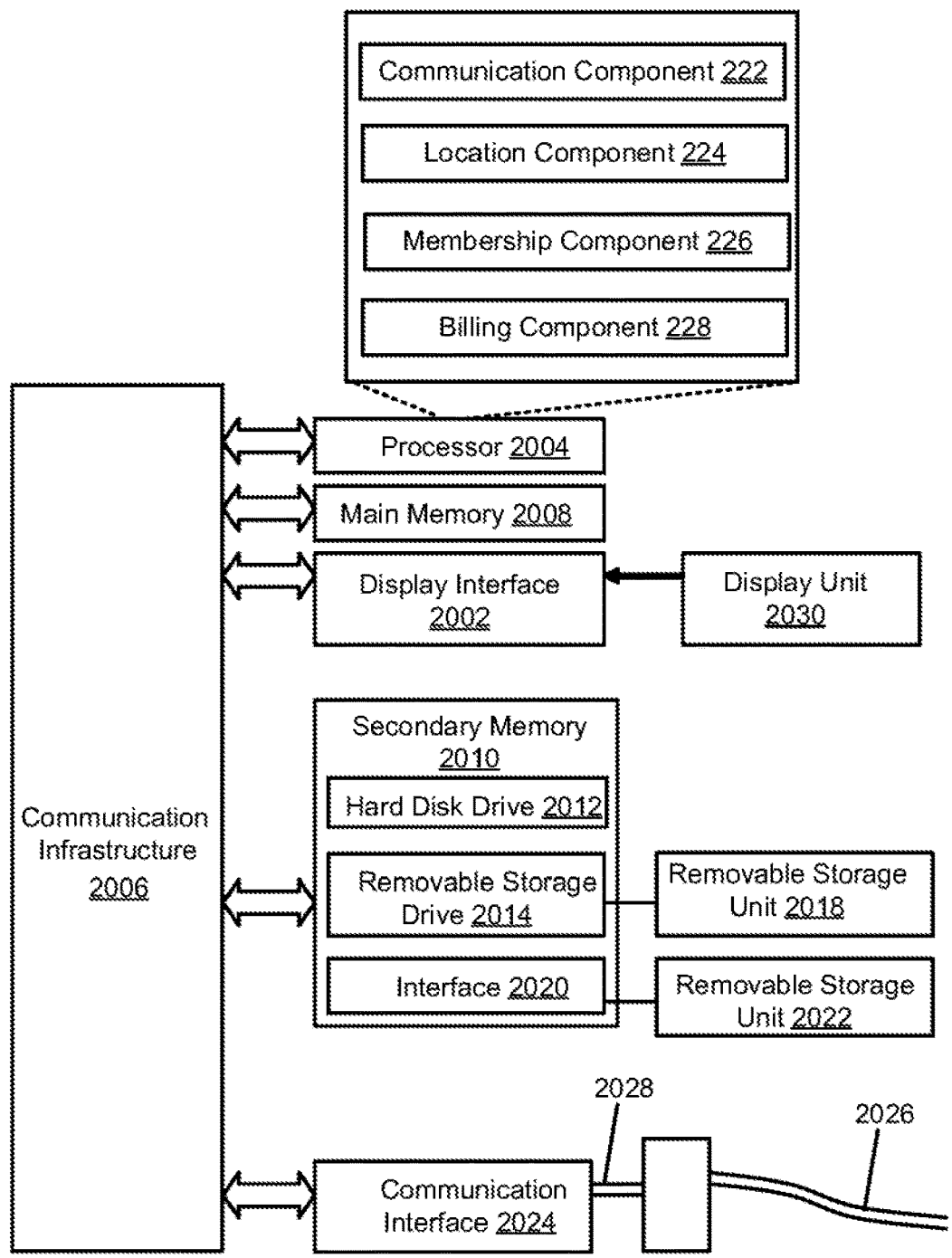
FIG. 6 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 6.

The computer system 2000 includes one or more processors, such as processor 2004. The processor 2004 is connected to a communication infrastructure 2006 (e.g., a communications bus, cross-over bar, or network). Various software aspects are described in terms of this example computer system. After reading this description, it will become apparent to a person skilled in the relevant art(s)

how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage drive 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard drive 2012, or communications interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 7:
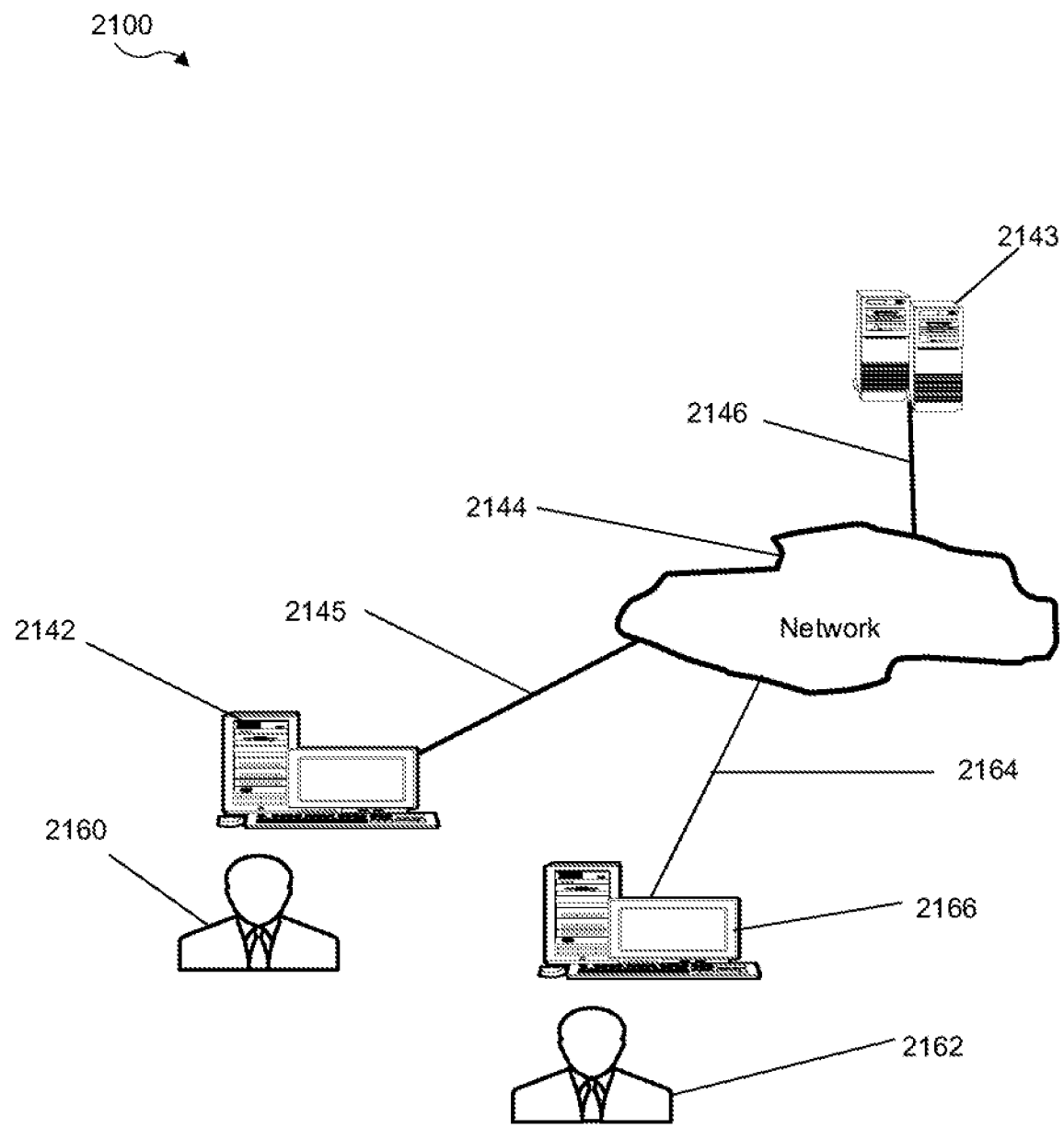
FIG. 7 illustrates a block diagram of various exemplary system components in accordance with aspects of the present disclosure.

FIG. 7 is a block diagram of various example system components, in accordance with an aspect of the present disclosure. FIG. 7 shows a communication system 2100 usable in accordance with the present disclosure. The communication system 2100 includes one or more accessors 2160, 2162 (also referred to interchangeably herein as one or more "users") and one or more terminals 2142, 2166. In one aspect, data for use in accordance with aspects of the present disclosure is, for example, input and/or accessed by accessors 2160, 2162 via terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of coordinating a battery exchange, comprising:
    receiving a request, for the battery exchange, from a requesting device associated with a requesting vehicle;
    identifying, a supplying vehicle eligible to exchange one or more batteries of the supplying vehicle, based at least on location information of the supplying vehicle;
    transmitting the location information of the supplying vehicle to the requesting device;
    transmitting an unlock signal to the supplying vehicle or the requesting device to unlock a compartment containing the one or more batteries for the battery exchange; and
    receiving one or more confirmation signals indicating completion of the battery exchange of the one or more batteries from the supplying vehicle to the requesting vehicle.

2. The method of claim 1, further comprises, prior to receiving the request, receiving an authorization from the supplying vehicle to participate in the battery exchange.

3. The method of claim 1, wherein the request includes at least one of location information of the requesting device, a number of the one or more batteries to be exchanged, and a time for the battery exchange.

4. The method of claim 1, wherein identifying the supplying vehicle further comprises at least one of:
identifying the supplying vehicle within a predetermined distance from the requesting device; and
identifying the supplying vehicle having at least one battery available for the battery exchange.

5. The method of claim 1, wherein the location information further comprises global positioning system information, a longitude coordinate, a latitude coordinate, or an address.

6. The method of claim 1, wherein transmitting the unlock signal further comprises transmitting the unlock signal including an unlock code to the requesting device, wherein a requester associated with the requesting device provides the unlock code to the supplying vehicle to gain access to the compartment.

7. The method of claim 1, wherein transmitting the unlock signal further comprises transmitting the unlock signal in response to receiving an indication from the requesting device to unlock the compartment.

8. The method of claim 1, wherein receiving the one or more confirmation signals further comprises receiving a confirmation signal from the supplying vehicle after the completion of the battery exchange.

9. A server, comprising:
a memory;
one or more processors operatively connected to the memory, the one or more processors being configured to:
receive a request, for a battery exchange, from a requesting device associated with a requesting vehicle;
identify, a supplying vehicle eligible to exchange one or more batteries of the supplying vehicle, based at least on location information of the supplying vehicle;
transmit the location information of the supplying vehicle to the requesting device;
transmit an unlock signal to the supplying vehicle or the requesting device to unlock a compartment containing the one or more batteries for the battery exchange; and
receive one or more confirmation signals indicating completion of the battery exchange of the one or more batteries from the supplying vehicle to the requesting vehicle.

10. The server of claim 9, wherein the one or more processors are further configured to, prior to receiving the request, receive an authorization from the supplying vehicle to participate in the battery exchange.

11. The server of claim 9, wherein the request includes at least one of location information of the requesting device, a number of the one or more batteries to be exchanged, and a time for the battery exchange.

12. The server of claim 9, wherein identifying the supplying vehicle further comprises at least one of:
identifying the supplying vehicle within a predetermined distance from the requesting device; and
identifying the supplying vehicle having at least one battery available for the battery exchange.

13. The server of claim 9, wherein the location information further comprises global positioning system information, a longitude coordinate, a latitude coordinate, or an address.

14. The server of claim 9, wherein transmitting the unlock signal further comprises transmitting the unlock signal including an unlock code to the requesting device, wherein a requester associated with the requesting device provides the unlock code to the supplying vehicle to gain access to the compartment.

15. The server of claim 9, wherein transmitting the unlock signal further comprises transmitting the unlock signal in response to receiving an indication from the requesting device to unlock the compartment.

16. The server of claim 9, wherein receiving the one or more confirmation signals further comprises receiving a confirmation signal from the supplying vehicle after the completion of the battery exchange.

17. A non-transitory computer readable medium having instructions stored therein that, when executed by one or more processors of a server, cause the one or more processors to:
receive, a request for a battery exchange, from a requesting device associated with a requesting vehicle;
identify, a supplying vehicle eligible to exchange one or more batteries of the supplying vehicle, based at least on location information of the supplying vehicle;
transmit the location information of the supplying vehicle to the requesting device;
transmit an unlock signal to the supplying vehicle or the requesting device to unlock a compartment containing the one or more batteries for the battery exchange; and
receive one or more confirmation signals indicating completion of the battery exchange of the one or more batteries from the supplying vehicle to the requesting vehicle.

18. The non-transitory computer readable medium of claim 17, wherein the one or more processors are further configured to, prior to receiving the request, receive an authorization from the supplying vehicle to participate in the battery exchange.

19. The non-transitory computer readable medium of claim 17, wherein the instructions for identifying the supplying vehicle further comprises instructions for at least one of:
identifying the supplying vehicle within a predetermined distance from the requesting device; and
identifying the supplying vehicle having at least one batter available for the battery exchange.

20. The non-transitory computer readable medium of claim 17, wherein the instructions for transmitting the unlock signal further comprises instructions for transmitting the unlock signal including an unlock code to the requesting device, wherein a requester associated with the requesting device provides the unlock code to the supplying vehicle to gain access to the compartment.

* * * * *